United States Patent [19]

Rheaume

[11] Patent Number: 4,510,198
[45] Date of Patent: Apr. 9, 1985

[54] SHAPED STRUCTURES OF GRAPHITE FABRICS, AND THE LIKE, AND DEEP DRAWN MOLDED PRODUCTS THEREFROM

[75] Inventor: Walter A. Rheaume, Fullerton, Calif.

[73] Assignee: Textile Products, Incorporated, Anaheim, Calif.

[21] Appl. No.: 417,123

[22] Filed: Sep. 13, 1982

[51] Int. Cl.³ .................................. B32B 7/00
[52] U.S. Cl. ............................ 428/246; 264/257; 264/546; 428/251; 428/252; 428/257; 428/258; 428/260; 428/272; 428/408; 428/902
[58] Field of Search ............. 428/246, 251, 252, 257, 428/258, 260, 272, 408, 902; 264/546, 257

[56] References Cited

U.S. PATENT DOCUMENTS 4,368,234  1/1983  Palmer ........................... 428/902

Primary Examiner—Marion McCamish
Attorney, Agent, or Firm—Willie Krawitz

[57] ABSTRACT

An interwoven fabric having moveable layers of graphite, fiberglass, Kevlar, and similar materials are wrapped or conformed around shaped mold parts. These layered shape parts are subsequently impregnated with resin and cured to produce a reinforced product having a reasonably uniform fiber density. Typical shaped structures include boxes, hemispheres, ojives, etc. The process is particularly suitable for producing structures where the fabric distortion is severe at corners, angles, and so forth.

9 Claims, 4 Drawing Figures

SHAPED STRUCTURES OF GRAPHITE FABRICS, AND THE LIKE, AND DEEP DRAWN MOLDED PRODUCTS THEREFROM

BACKGROUND OF THE INVENTION

This invention relates to the manufacture of shaped parts or structures from fabrics having good resistance to high temperatures and good tensile strength characteristics. These shaped parts are usually then impregnated with resin and cured. The parts have use in aerospace where lightweight structures with good tensile properties are important.

In the prior art, lightweight shaped structures of multi-ply woven fabric are initially formed by wrapping or conforming individually pre-cut strips of the fabric around a shaped structure that is usually a mold. The structure may have a shape such as a box, hemisphere, an ojive, a five or eight sided container, etc. The wrapped parts are then impregnated with a thermosetting resin and then cured. The technique of using pre-cut and pre-shaped strips of fabric is necessary, because many parts have sharp edges and corners that defy a uniform wrapping using individual, wide fabric plies. It would be preferred to employ a continuous fabric that is wrapped around a mold to form these type of parts, rather than applying discontinuous strips to a mold surface. However, it has been found that while the inner ply of the usual three-ply fabric will conform to the structure, the outer ply of the fabric becomes excessively stretched, particularly around corners, edges, crevices, etc.

In addition, these prior art techniques of wrapping individually shaped strips of fabric around a structure require that the wrapped shapes are impregnated with resin very soon after they are produced. In many cases this necessitates that the prepeg material be kept on hand and refrigerated.

Obviously, it would be preferred to wrap a multi-ply fabric around a structure that can accommodate for variations of its non uniform surface.

Also, it would be preferred to eliminate the need for applying pre-cut and pre-shaped strips to a structure, and instead to form the lightweight shape in a single wrapping operation; this would reduce production costs.

THE INVENTION

According to the invention, there is provided a process and woven structure therefrom, in which a multi-layered fabric of a material having high tensile strength and resistance to a high temperature environment is conformed or wrapped around a mold or similar substrate, the fabric including upper and bottom layers partly interwoven with an inner layer to form moveable layers with respect to each other. In the case of a three-ply fabric, each of the three layers of the fabric is moveable with respect to each other, and is accomplished by interlocking the center layer of the fabric with both the top and bottom layers.

A typical interweave between the center layer and each of the top and bottom layers is about 5% of the total weave in a layer. The extent of interweave is determined by the surface contours of the structure to which the fabric is applied. A 5% interweave is suitable for open containers such as hemispheres, eight sided cubes, pentagonal shapes, etc. However, if the structure has more severe irregularities, a lower percentage interweave might be required. Similarly, for a structure with few irregularities, such as a round rod, a higher percentage of interweave content, could be used. Hence, the extent of interweave between the center and outer layers of the fabric is not critical and may vary from the 5% total weave in a layer.

A three-layered fabric may be constructed for example using graphite, Kevlar or fiberglass, but there are many other possibilities. For example, the inner layer may be Kevlar, and the two outer layers are graphite; the inner layer may be graphite and the outer two layers are fiberglass; the inner layer may be fiberglass, and the outer two layers are Kevlar; the inner layer may be Kevlar, and the outer two layers are graphite and fiberglass, etc.

The woven structure is then impregnated and cured with a thermosetting resin such as a polyimide, epoxy, etc., or the structure may be stored and then resin cured. This latter option is very desirable because this enables the manufacturer to reduce refrigeration equipment and power that is necessary to preserve the uncured resin.

DESCRIPTION OF THE PREFERRED EMBODIMENTS

Figure 1:
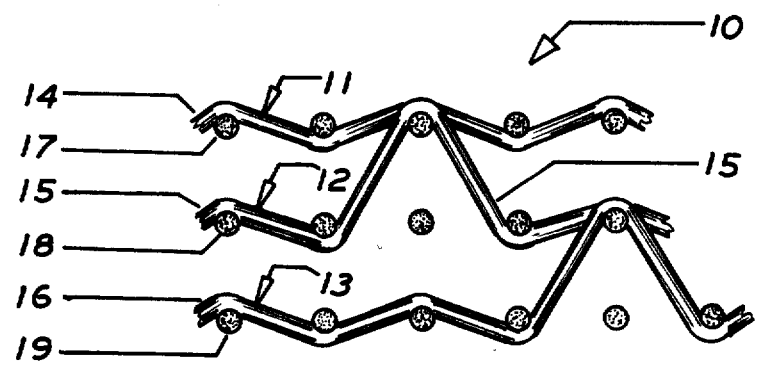
FIG. 1 is a sectional view in side elevation showing a three-ply fabric that may be employed in the process of this invention.

FIG. 1 shows a three-ply fabric 10 of graphite having interwoven upper, center and bottom layers 11, 12 and 13, respectively. Each layer comprises a plain weave with warp yarns 14, 15 and 16, and filling yarns 17, 18 and 19. About 5% of the warp yarn 15 is interwoven with the upper layer 11, and about 5% of the bottom layer 13 is also interwoven with the warp yarn 15.

Normally in the prior art, a multi-ply fabric would be applied to a mold as individual strips that are then built up to a suitable thickness. However, when using the multi-ply fabric 10 in the process of this invention, the individual plies are free to move somewhat with respect to each other; this enables the fabric to be conformed to the mold as a continuous and uniform wrapping. Structurally, this represents a considerable improvement over a molded product built up from a series of strips, and of course, the process is less expensive in terms of time and labor.

Figure 2:
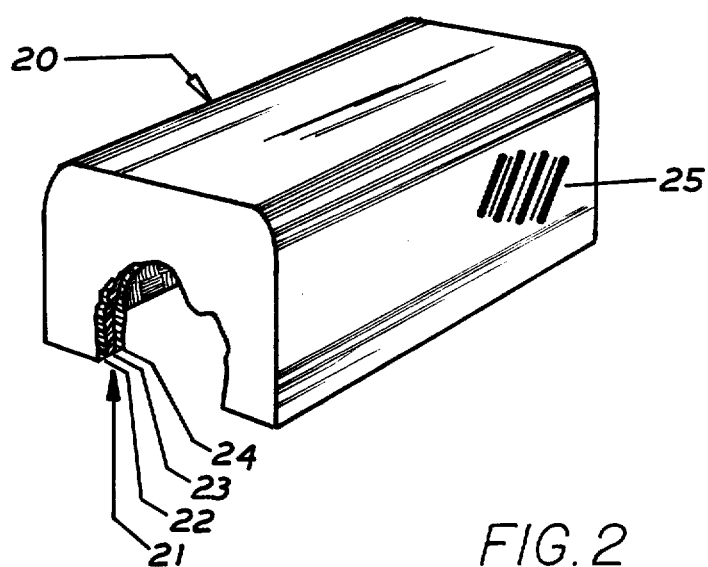
FIGS. 2, 3 and 4 are external perspective views showing various structures that have been wrapped with the fabric, impregnated with resin, and then cured.
Figure 3:
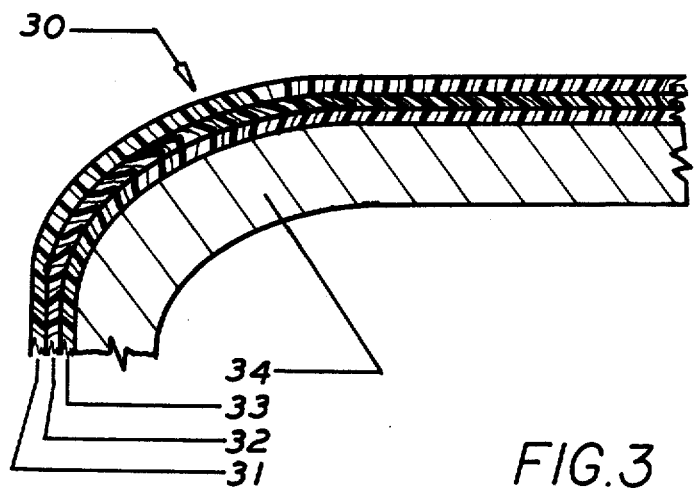
Figure 4:
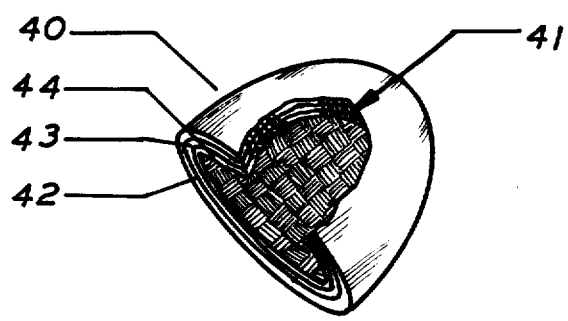

In FIGS. 2, 3 and 4, various types of fabric shapes and structures are illustrated. In FIG. 2, a rectangularly shaped, resin cured container structure 20 of interwoven (5%) graphite, three ply fabric 21 is shown. The graphite fabric having layers 22, 23 and 24 was woven from a 3000 yarn, and the outer layers had a pick and plain weave of 10 strands/inch. The three layers were about 0.025" thick, and the fabric weight was 460 grams/sq. yard. After trimming the fabric ends, the wrapped structure was then impregnated with resin 25, cured and deep drawn to form the container structure 20. Normally, it is quite difficult to wrap this type of configuration with strips due to the presence of sharp corners and edges. As an alternative, following the wrapping operation, the container structure 20 may be stored for several months and then impregnated with a thermosetting resin such as a polyimide, epoxy, etc.

In FIG. 3, a shaped structure 30 is formed by wrapping a fabric having three interwoven layers (5%) of fiberglass 31, graphite 32 and Kevlar 33, respectively, around a mold 34. The fabric ends are trimmed and the shaped fabric is then impregnated with resin, followed by curing usually under heat and pressure, to produce the final cured structure.

In FIG. 4, a mold 40 having an ojive shape is shown wrapped with three-ply fabric 41 having an outer layer 42 of Kevlar, and center and inner layers of graphite 43, 44 of graphite. Following wrapping of the fabric onto the mold, the free end of the fabric is trimmed, and the fabric wrapped mold may then be stored prior to resin impregnation and curing. Alternatively, the wrapped mold may be resin impregnated immediately and then cured. The cured product presents a distinct advantage over a product made from discontinuous strips in that is has a smooth surface, with no seams, joints, overlaps, discontinuities, etc.

The process and woven structures of this invention eliminates the need for cutting the fabric along a pattern into strips and then applying the individual strips to a mold. By applying the fabric to the mold in a single, continuous wrapping, process time and costs are reduced considerably, and the resulting structure has considerably improved tensile and impact strength.

I claim:

1. A process for forming a woven, multi-layer, continuous fabric into resin-impregnated shapes, comprising:
   a. applying the fabric to a mold, as a continuous and uniform wrapping, the fabric including upper and bottom layers partly interwoven with an inner layer to form moveable layers with respect to each other, the interweave between an inner layer and an outer layer being about 5% of the total weave in a layer;
   b. continuing applying the fabric to the mold and moving the layers with respect to each other to conform the fabric uniformly with the mold and any irregularities thereon, until the fabric has been built up to a final shape;
   c. impregnating the shaped fabric with a thermosetting resin; and,
   d. curing the resin to form the cured, resin-impregnated fabric shape.

2. The process of claim 1, in which the fabric wrapped shape is stored prior to impregnation and curing.

3. The process of claim 1, in which the fabric layers are selected from the class consisting of fiberglass, graphite and Kevlar.

4. The process of claim 1, in which the fabric comprises three layers.

5. A woven, continuous, multi-layered, molded fabric shape impregnated with a thermosetting resin, the fabric having upper and bottom layers interwoven with an inner layer, thereby comprising three moveable layers with respect to each other, the interweave between an inner layer and the upper and bottom layers being about 5% of the total weave in a layer;

the fabric being applied to a mold while moving the fabric layers with espect to each other to conform the fabric uniformly with respect to the mold and any irregularities thereon, and continuing application of the fabric to the mold until the fabric has been built up to a final shape.

6. The molded fabric shape of claim 5, in which the resin has been cured.

7. The molded fabric shape of claim 6, in which the fabric wrapped shape is stored prior to curing.

8. The molded fabric shape of claim 5, in which the upper and bottom layers are woven as a pick and plain weave.

9. The molded fabric shape of claim 5, in which the fabric layers are selected from the class consisting of fiberglass, graphite and Kevlar.

* * * * *